United States Patent
Filhol

(10) Patent No.: US 7,190,502 B2
(45) Date of Patent: Mar. 13, 2007

(54) OSCILLATING MICROMIRROR WITH BIMORPH ACTUATION

(75) Inventor: Fabien Filhol, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/937,182

(22) Filed: Sep. 8, 2004

(65) Prior Publication Data

US 2005/0063038 A1 Mar. 24, 2005

(30) Foreign Application Priority Data

Sep. 8, 2003 (FR) ................................. 03 50509

(51) Int. Cl.
*G02B 26/08* (2006.01)
(52) U.S. Cl. ........................ 359/224; 359/321
(58) Field of Classification Search ................ 359/224, 359/321
See application file for complete search history.

(56) References Cited

U.S. PATENT DOCUMENTS

| 5,969,465 A | 10/1999 | Neukermans et al. |
| 6,198,565 B1 * | 3/2001 | Iseki et al. ................... 359/224 |
| 2002/0020810 A1 | 2/2002 | Wine et al. |
| 2002/0021860 A1 | 2/2002 | Ruan et al. |
| 2002/0118472 A1 | 8/2002 | Hill |

OTHER PUBLICATIONS

Yamada et al., "A Novel Asymmetric Silicon Micro-Mirror for Optical Beam Scanning Display", 1998, IEEE, pp. 110-115.
Brissaud, Michael, "Modelling of a cantilever non-symmetric piezoelectric bimorph", Jul. 9, 2003, pp. 832-844.

* cited by examiner

*Primary Examiner*—Hung Xuan Dang
*Assistant Examiner*—Joseph Martinez
(74) *Attorney, Agent, or Firm*—Thelen Reid Brown Raysman and Steiner LLP

(57) ABSTRACT

The present invention relates to a micromirror comprising a mobile part with a reflecting area, a fixed part, two torsion arms originating from the mobile part materializing an axis about which the mobile part can oscillate, this axis being approximately parallel to a principal plane of the mobile part and passing through the mobile part while being offset from the center of mass of the mobile part, each torsion arm having one end connected to the fixed part through bimorph actuation means. The bimorph actuation means comprise a solid stack with deposited or add-on layers for each torsion arm, including a part made of an active material capable of changing volume and/or shape under the effect of an excitation, co-operating with a passive flexible structure.

19 Claims, 7 Drawing Sheets

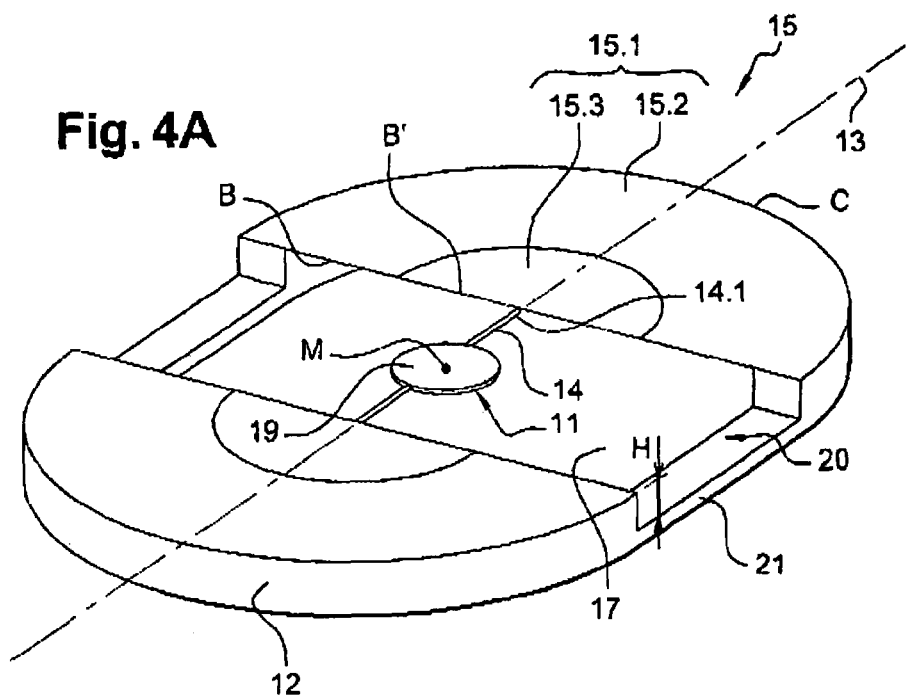
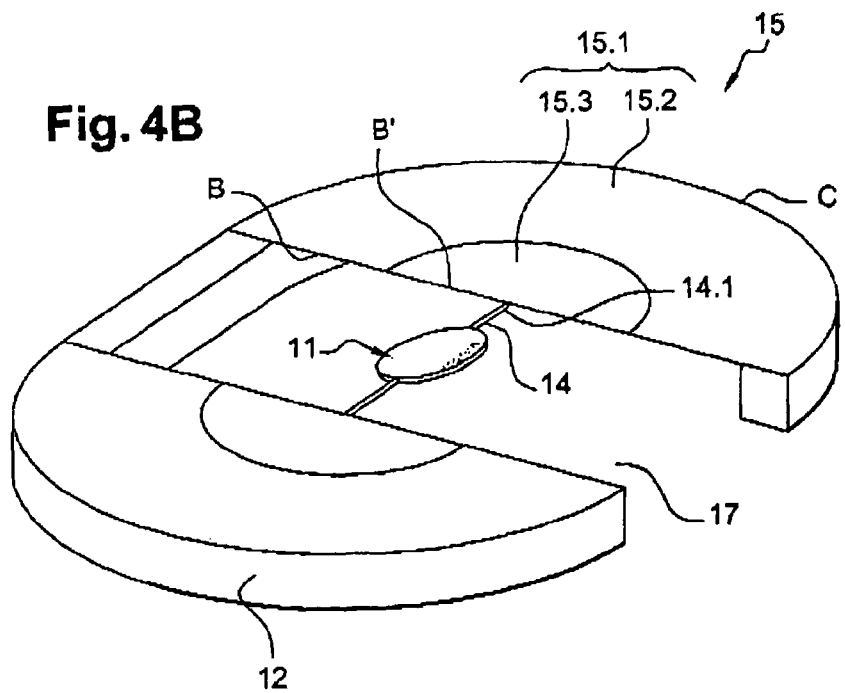

OSCILLATING MICROMIRROR WITH BIMORPH ACTUATION

TECHNICAL DOMAIN

This invention relates to a micromirror capable of operating in oscillating mode due to bimorph actuation.

Micromirrors derived from techniques for micro-machining semiconducting materials are becoming increasingly widespread because they have a very special advantage for deflection of light beams due to the combination of their speed, precision, low energy consumption and low manufacturing cost.

This type of micromirror comprises a globally tray-shaped mobile part capable of oscillating about a torsion axis fixed to a fixed part. The mobile part comprises a reflecting zone to deflect a light beam pointed at it.

In this operating mode, the mobile part will oscillate at its resonant frequency, and the reflected light beam then performs periodic scanning with a longer period due to the mechanical resonance phenomenon.

The application field of these micromirrors may for example be scanners in printers, barcode readers. In this operating mode, micromirrors can also be used in new applications such as displays by scanning light beams on the retina or endoscopic confocal microscopes.

STATE OF PRIOR ART

Conventionally, this type of micromirror comprises a generally tray-shaped mobile part provided with a principal plane and at least one reflecting area, a fixed part, two torsion arms originating from the mobile part, connected to the fixed part, materializing an axis approximately parallel to the principal plane, and means of controlling the oscillation of the mobile part around the axis.

The optical quality of micromirrors depends essentially on the planeness of their reflecting area. The mobile part usually comprises a micro-machined tray made of a semiconducting material forming the reflecting area or covered with at least one reflecting layer and possibly a protection layer. Surface deformations may be induced by elements located under the reflecting area, constraints in the surface layer(s) of the mobile part (for example the reflecting metallic layer or the protection layer) and the dynamic deformations that occur during displacement of the mobile part.

Use of monocrystalline or polycrystalline silicon a few tens of micrometers thick can result in mobile parts with a satisfactory planeness. This range of thicknesses prevents deformations generated by an acceleration during a movement or by constraints generated by the surface layer(s).

The reflecting area must be sufficiently large to limit the diffraction effect of the light beam on its aperture. Micromirrors with a size of more than 500 micrometers are typically used.

Obviously, these dimensions are not limitative and they actually depend on the application.

The document "A novel asymmetric silicon micromirror for optical beam scanning display", K. Yamada and T. Kuriyama, Proceedings MEMS 98, IEEE, pages 110–115, describes an asymmetric micromirror with a piezoelectric bimorph actuation. FIG. 1 shows such a micromirror in three dimensions. FIGS. 2A, 2B, 2C, 2D are views of the mobile part explaining its oscillation movement and FIG. 3 is a graph showing the variation of the angle of inclination θ, the vertical displacement δz and the acceleration $d^2z/dt^2$ of the mobile part as a function of time.

Refer to FIG. 1. The micromirror comprises a mobile part 1 and a fixed part 2. The mobile part 1 is globally in the same shape as a tray. It is designed to be displaced by oscillating about an axis 3. The axis 3 passes through the mobile part 1 while being offset from its centre of mass M and is approximately parallel to a principal plane of the mobile part 1. If the mobile part 1 is a tray with constant thickness, the centre of mass M is coincident with the geometric centre of the mobile part 1.

Two torsion arms 4 connect the mobile part 1 to the fixed part 2 through bimorph actuation means 5 of the piezoelectric type. This type of bimorph piezoelectric type actuation means comprise a part that will change volume under the effect of an excitation. The torsion arms 4 materialize the axis 3. They originate from the mobile part 1. These torsion arms 4 are placed such that they are in line with each other. They have one end 6 fixed by embedding a frame 51 that is fixed by gluing onto one face of a wafer 52 made of piezoelectric ceramic. This wafer 52 is called a bimorph element. The other face of the bimorph element 52 made of piezoelectric ceramic is glued to the fixed part 2 that is in the form of a wafer. The bimorph element 52 made of piezoelectric ceramic and the frame 51 to which it is glued contribute to forming the bimorph actuation means 5. The bimorph element 52 made of piezoelectric ceramic and the frame 51 are relatively thick and the frame 51 is rigid. The bimorph element 52 made of piezoelectric ceramic and the frame 51 are glued together by means of a spacer that follows a first edge of the substrate and the bimorph element made of piezoelectric ceramic and the fixed part are glued together through another spacer that follows a second edge of the substrate opposite the first edge.

Due to these spacers that are marked as reference 10, spaces 8 are formed on each side of the bimorph element 52 made of piezoelectric ceramic. This structure does not form a solid stack due to the presence of the spaces 8. The spaces enable the piezoelectric material to vibrate freely.

Excitation means (not shown) co-operate with the bimorph element 52 made of piezoelectric ceramic to apply an electric field to it in order to vary its volume. The volume variation may be induced by expansion or contraction of the piezoelectric ceramic. The electrical field is approximately perpendicular to the principal faces of the bimorph element 52 made of piezoelectric ceramic and therefore to the principal plane of the mobile part 1 in the rest position. In FIG. 1, the mobile part 1 is at rest.

Due to the frame 51 and the torsion arms 4, the mobile part 1 is thus suspended above the fixed part 2. The mobile part 11 comprises principal faces, one of which is facing the fixed part 2 and the other is provided with a reflecting area 9 that will reflect light.

When the bimorph element 52 made of piezoelectric ceramic is subjected to an alternating electrical field in the vertical direction produced by the pair of electrodes, it starts to vibrate vertically (in the direction of the double arrow F). In this movement, it entrains the frame 51 to which it is glued and the torsion arms 4. Since the frame 51 is rigid and is not in direct contact with the bimorph element made of piezoelectric material 52 due to the presence of the spacer 10 and the space 8, it does not deform but is simply entrained as a whole in a vertical vibration movement. Since the torsion arms 4 are offset from the centre of mass M of the mobile part 1, the asymmetry of the distribution of masses around the axis 3 will generate a torque causing the mobile part 1 to follow an oscillation movement around the axis 3.

The micromirror is then in an activated state. FIGS. 2A to 2D illustrate various positions of the mobile part 1. In FIGS. 2A and 2B, it is in a median position that corresponds to its position at rest. In FIG. 2C, it is assumed that it is in an extreme position, inclined on one side of the axis, and in FIG. 2D, it is assumed that it is in an extreme position inclined on the other side of the axis.

The oscillation movement of the mobile part 1 is synchronous with the excitation of the bimorph actuation means 5. The oscillation amplitude of the mobile part is maximum when the frequency of the excitation is equal to the mechanical resonant frequency of the mobile part 1.

FIG. 3 shows existing phase shifts between the angle of inclination $\theta$ of the mobile part 1, the vertical displacement $\delta z$ of the bimorph element made of piezoelectric ceramic 52 and its acceleration $d^2z/dt^2$. The position of the mobile part 1 at rest, which is approximately horizontal, corresponds to a zero angle of inclination $\theta$. The position occupied by the mobile part 1 is materialized for several characteristic instants.

Therefore, these micromirrors will oscillate about an axis 3 approximately parallel to a principal plane of their mobile part.

One disadvantage of such a structure is related to bonding of the bimorph element made of piezoelectric ceramic on the frame. This bonding can only be made on a relatively rigid and therefore relatively thick frame, otherwise gluing is difficult if it is fragile. The rigidity of the frame makes it solid and heavy and it is difficult to make it move under the action of the variation of the volume of the bimorph element made of piezoelectric ceramic. A large force has to be applied and therefore larger bimorph actuation means are necessary.

Several such micromirrors are made simultaneously and collectively using microelectronic and micro-machining techniques on a common substrate. Bimorph elements made of piezoelectric ceramic cannot be glued collectively. They have to be added on individually to glue them, which considerably increases the production cost.

Another disadvantage is that it may be fairly complicated to glue piezoelectric ceramics to the frame, particularly if the frame is made of monocrystalline silicon, and to the wafer of the fixed part 2, due to the small size of the objects to be aligned and glued together.

Another disadvantage is that the torsion arms are not at a location at which the movement amplitude is maximum. They would have to have been fixed to the frame so as to make them as far as possible from the spacer that holds the frame to the bimorph element made of piezoelectric ceramic. Therefore the oscillation amplitude of the mobile part is limited.

PRESENTATION OF THE INVENTION

The purpose of this invention is to propose a micromirror capable of oscillating about an axis by a bimorph effect, and that does not have the limitations and difficulties mentioned above.

More precisely, one purpose of the invention is to propose a micromirror that can be collectively manufactured using micro-electronic and micro-machining techniques at a lower cost than for prior art.

To achieve this, this invention proposes a micromirror comprising a mobile part with a reflecting area, a fixed part, two torsion arms originating from the mobile part materializing an axis about which the mobile part can oscillate, this axis being approximately parallel to a principal plane of the mobile part and passing through the mobile part while being offset from the centre of mass of the mobile part. Each torsion arm has one end connected to the fixed part through bimorph actuation means. The bimorph actuation means comprise a solid stack with deposited or add-on layers for each torsion arm, including a part made of an active material capable of changing volume and/or shape under the effect of an excitation, co-operating with a passive flexible structure.

The active material may be a piezoelectric material, a magnetostrictive material, a thermal effect material with a coefficient of thermal expansion sufficiently different from the coefficient of thermal expansion of the material from which the passive flexible structure is made, or a shape memory alloy.

The bimorph actuation means include means of excitation of the part made of an active material.

It is preferable that a torsion arm should be connected to the passive flexible structure.

To maximize the oscillation amplitude, it is preferable that the connection between the torsion arm and the passive flexible structure should be made in an area with a strong deformation under the effect of the volume and/or shape change of the part made of an active material, induced by excitation.

The part made of an active material and the passive flexible structure have a total or partial overlap. In order to maximize the amplitude of oscillations, it is preferable that the overlap should be made in an area with a strong deformation of the passive flexible structure when it is partial.

The passive flexible structure may be in the form of a membrane fixed to the fixed part through at least one edge portion and with at least one other free edge portion on which a torsion arm is fixed.

The membrane may be approximately a half-disk with a rounded edge and a straight edge, the straight edge being free and the rounded edge being fixed to the fixed part.

The part made of an active material may also be approximately in the form of a half-disk with a straight edge approximately in line with and centred on the straight edge of the membrane.

The length of the straight edge of the half-disk of the part made of an active material is equal to about $\frac{2}{3}$ of the length of the straight edge of the membrane, also to maximize the amplitude of oscillations.

As a variant, the passive flexible structure may be in the form of a beam, the ends of which are fixed to the fixed part, a torsion arm being fixed approximately in a central area of the beam.

The part made of an active material may occupy the central area of the beam leaving each end exposed over about $\frac{1}{6}$ of the length of the beam, to maximize the amplitude of oscillations.

This invention also relates to a process for manufacturing a micromirror characterized in this way. It may include the following steps:

a) for each torsion arm, production of the part made of an active material associated with excitation means (if any) on a surface semiconducting layer of a semiconducting substrate formed from an insulating layer buried between a base semiconducting layer and the surface semiconducting layer, b) delimitation of the contour of the mobile part, the torsion arms, and the passive flexible structure by etching in the surface semiconducting layer, and stopping on the buried insulating layer, c) elimination of the base semiconducting layer and the insulating layer buried under and around the mobile part, the torsion arms and under part of the passive flexible structure so as to release the mobile part and the torsion arms, to authorize deformation of the passive flexible structure and create the fixed part in the remainder of the base semiconducting layer and the buried insulating layer.

The reflecting area can be made on the surface semiconducting layer by depositing a reflecting material and delimiting its contour, before step b).

When the active material is a piezoelectric or thermal effect material, the excitation means can consist of a first electrode between the surface semiconducting layer and the part made of an active material, and a second electrode above the part made of an active material.

An insulating base can be inserted between the first electrode and the surface semiconducting layer.

Another insulating base may be inserted between the first electrode and the second electrode to isolate them from each other.

BRIEF DESCRIPTION OF THE DRAWINGS

This invention will be better understood after reading the description of example embodiments given purely for information and in no way limitative, with reference to the appended Figures, wherein:

FIGS. 4A, 4B, 4C and 4D show views of first example and second example of the micromirror according to the invention, deformations of one of their membranes and a top view of their bimorph actuation means, respectively;

Figure 1:
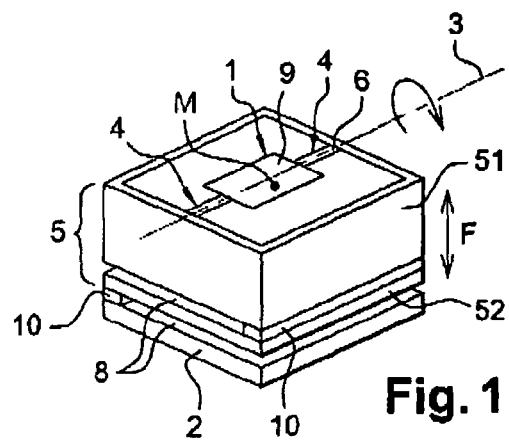
FIG. 1 (already described) shows a micromirror with bimorph actuation according to prior art, in three dimensions.

The different variants should be understood as not being mutually exclusive.

Identical, similar or equivalent parts of the different Figures are marked with the same numeric references so as to facilitate comparison between different Figures.

The different parts represented in the Figures are not necessarily shown at the same scale, to make the Figures more easily readable.

DETAILED PRESENTATION OF PARTICULAR EMBODIMENTS

Refer to FIG. 4A that shows an example micromirror according to the invention. This micromirror comprises a mobile part 11 with a reflecting area 19, a fixed part 12, two torsion arms 14 originating from the mobile part 11 and materializing an axis 13 around which the mobile part 11 is capable of oscillating. The mobile part 11 is approximately in the form of a tray. The axis 13 is approximately parallel to a principal plane of the mobile part 11, it passes through the mobile part 11 and is offset from the centre of mass M of the mobile part 11. This means that the axis 13 is not an axis of symmetry of the mobile part 11. The micromirror is said to be asymmetric.

Each of the torsion arms 14 has one end 14.1 connected to the fixed part 12 through bimorph actuation means 15. The bimorph actuation means 15 comprise a solid stack 15.1 with deposited or add-on layers comprising a part 15.3 made of active material co-operating with a passive flexible structure 15.2, at the end 14.1 of each torsion arm 14. The stack 15.1 is also called bimorph. An add-on layer means a layer that is located on a wafer and that is glued onto another wafer before the base of the first wafer is removed. This add-on technique is conventionally used in microsystems.

For the purposes of this invention, an active material means a material that can change volume and/or shape under the effect of excitation. The fact of making such an active material co-operate with a passive flexible structure in a solid stack is a means of obtaining a deformation at the interface, this deformation being transmitted into the passive structure which, if it is flexible, deforms again in turn. The active material used could be a piezoelectric material, for example such as zinc oxide (ZnO), lead zirconate titanate $(Pb(Zr52, Ti48,)O_3)$ known as PZT, or polyvinylidene difluoride known as PVDF. These materials change volume during an excitation. The volume change is not isotropic and therefore the shape also changes. The excitation signal to be applied to a piezoelectric material to make it change volume is an electric field, for example induced between two electrodes located on each side of the piezoelectric material. Bimorph actuation means with a piezoelectric material as the active material usually result in modest displacements, but produce large forces for moderate excitation voltages. The piezoelectric effect is very fast (for example up to a few gigaHertz).

The active material capable of changing volume may be a material known as a thermal effect material with a coefficient of thermal expansion sufficiently different from the coefficient of thermal expansion of the passive flexible structure. For example, the material used may be zinc oxide if the material of the passive flexible structure is silicon.

The excitation to be applied to such an thermal effect active material is a temperature variation, for example caused by heating due to the Joule effect caused by at least one resistance affixed to the active material or placed close to it. The resistivity of zinc oxide is of the order of $10^4$ ohms.cm. As a variant, a current could be circulated in the active material (about a few amperes) to heat it using the Joule effect. This causes an expansion of the active material and this expansion is greater than the expansion of the flexible passive structure with which it co-operates. When the current drops, cooling by dissipation of heat can make the active material return to rest. This type of thermal effect materials supplies large forces and large displacements. However, they are limited to relatively low frequencies, typically up to about one kilo Hertz.

Magnetostrictive materials are also active materials. Terfenol-D (registered trademark of the Naval Surface Warfare Center, formerly the Naval Ordinance Labs company) is an alloy of iron (Fe), terbium (Tb) and dysprosium (Dy), and is one example of a magnetostrictive material. These materials use the giant magnetostriction effect that causes a volume change when they are subjected to an external magnetic field. For example, the excitation may be caused by a magnetic field induced by a magnet or a winding through which a current passes. Magnetostrictive materials have a fast response (of the order of one microsecond). There is no need for the excitation signal to use conducting tracks and/or electrodes as in other cases, which simplifies the arrangement. The excitation means may be external to the bimorph. A magnet can be used.

Shape memory alloys are also active materials. They change shape when an excitation is applied to them. An alloy of titanium (Ti) and nickel (Ni) could be used. This type of alloy can easily be deposited in thin layers. These materials use a crystalline phase change effect that causes a shape change when the temperature changes. This deformation is reversible during cooling. Excitation may for example be caused by heating induced by a thermal resistance affixed to the material placed close to it. These shape memory materials can cause large displacements with high forces but they are slow. They are limited to frequencies typically varying up to about 100 Hertz.

When an appropriate excitation signal is applied on or close to the active material, it will deform in compression or in expansion depending on the direction of the applied excitation signal (direction of the electric field, direction of the magnetic field, direction of the temperature variation). FIG. 4 do not show any means of excitation of the part made of an active material, for reasons of clarity. Their installation is not difficult for those skilled in the art. However, these means are shown approximately in FIG. 5A with reference 15.4.

Due to the bimorph effect, the passive flexible structure 15.2 will bend in one direction or the other following the movement induced by the deformation caused by the volume and/or shape change of part 15.3 made of active material.

When the excitation produces an alternating vertical deformation of the active material, a vertical acceleration transmitted by the passive flexible structure will be applied to each end 14.1 of the torsion arms 14, and the asymmetry of the distribution of masses in the mobile part 11 about the axis 13 in torsion will generate a torque that will displace the mobile part 11 in rotation. Rotation of the mobile part 11 is synchronous with the excitation applied to the part made of an active material and when the excitation is at the same mechanical resonant frequency as the mobile part 11, the oscillation amplitude of the mobile part 11 is maximum.

When the centre of mass M of the mobile part 11 is displaced, excitation of the torsion resonant mode is facilitated compared with other mechanical modes (oscillation in the plane, vertical oscillations). These other modes are parasite for the required function.

Refer to FIG. 4B that shows the mobile part 11 in an inclined position in an active state. The grey position provides a means of identifying the area of the mobile part 11 with the greatest movement amplitude. This is its edge furthest from the axis 13.

In a stack 15.1, the connection between the torsion arm 14 and the fixed part 12 is made at the passive flexible structure 15.2. The flexible structure 15.2 may be made by a membrane fixed to the fixed part 12 through at least one edge portion and with at least one other edge portion that is free. Thus, it can deform. The free end 14.1 of a torsion arm 14 is attached to the edge portion that is free. The membrane 15.2 projects over the free edge portion.

In the example shown in FIGS. 4A and 4B, the passive flexible structure 15.2 is a membrane approximately in the form of a half-disk with a rounded edge C and a straight edge B (which approximately corresponds to a diameter of the disk from which the half-disk is derived). The rounded edge C is embedded in the fixed part 12. The straight edge B is the free edge. Its two ends that are common to the rounded edge C are fixed to the fixed part 12.

The part 15.3 made of an active material is formed from at least one thin layer of active material that extends on the membrane 15.2. It was deposited or added onto the membrane 15.2, for example by a physical deposition process (for example such as cathode sputtering) or a chemical process (for example such as vapour phase deposition, evaporation of solutions). There is no space between the two, but there may be an electrode or a conducting track, excitation means and/or insulation. The part 15.3 made of an active material may fully cover the membrane 15.2 but this is not necessary. All that is necessary is that it should overlap it in a strongly deformed area, particularly at the junction between the end of the torsion arm and the membrane so that the oscillation amplitude is large.

In the example shown in FIG. 4, the part made of an active material is also approximately in the form of a half-disk in which the straight edge B' is approximately in line with and centred on the edge B of the membrane 15.2. The two half-disks are superposed. Centred means that the middle of one straight edge is above the middle of the other straight edge.

Figure 4C:
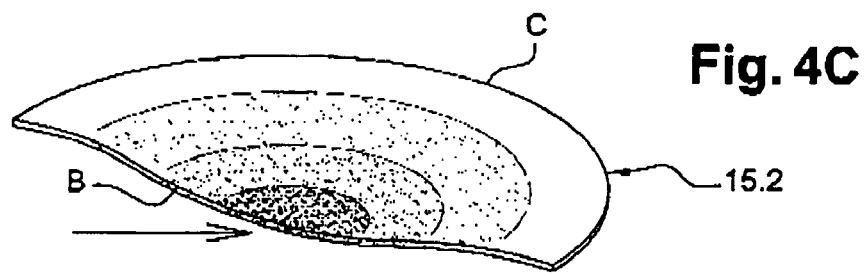

FIG. 4C shows the deformation of the half-disk membrane 15.2 under the effect of a force applied by the part 15.3 made of an active material. It is in the form of a half-dish. The maximum vertical deformation is located in the central part of the disk from which the membrane 15.2 is derived. The straight edge B of the membrane 15.2 is deformed and the maximum deformation occurs at its middle. The tip of the arrow shows the most deformed area. The rounded edge C is an area that hardly deforms since it is firmly fixed to the fixed part 12. The end 14.1 of the torsion arm 14 that co-operates with the membrane 15.2 is fixed approximately at the middle of its straight edge B. In FIG. 4C, the grey shading illustrates the amplitude of the deformation, in which the deformation is greater when the grey is darker.

Therefore in the micromirror, there are two half-disk membranes 15.2, in which the straight edges B face each other. The two membranes 15.2 are approximately plane and extend approximately in the same plane when they are at rest. They are separated by a space 17 in which the mobile part 11 is suspended by torsion arms 14. The space 17 extends under the mobile part 11 so that it is not hindered in its movement.

The space 17 may be the inside part of a cavity 20 delimited by the fixed part 12 and with a bottom 21 that faces the mobile part at rest. The passive flexible structure 15.2 is fixed to a part of the fixed part 12 that forms the walls 22 of the cavity 20. The depth H of the cavity 20 is chosen to be greater than the distance separating the axis 13 from the edge of the mobile part 11 that is furthest from it. Thus, the mobile part 11 does not hit the bottom 21 during its movements.

As a variant, the fixed part 12 may be recessed with regard to the mobile part 11 as shown in FIG. 4B. It may be approximately in the form of a split or unsplit annular frame. The largest part of the stack 15.1 projects over the fixed part 12. The recess corresponding to the space 17.

Figure 4D:
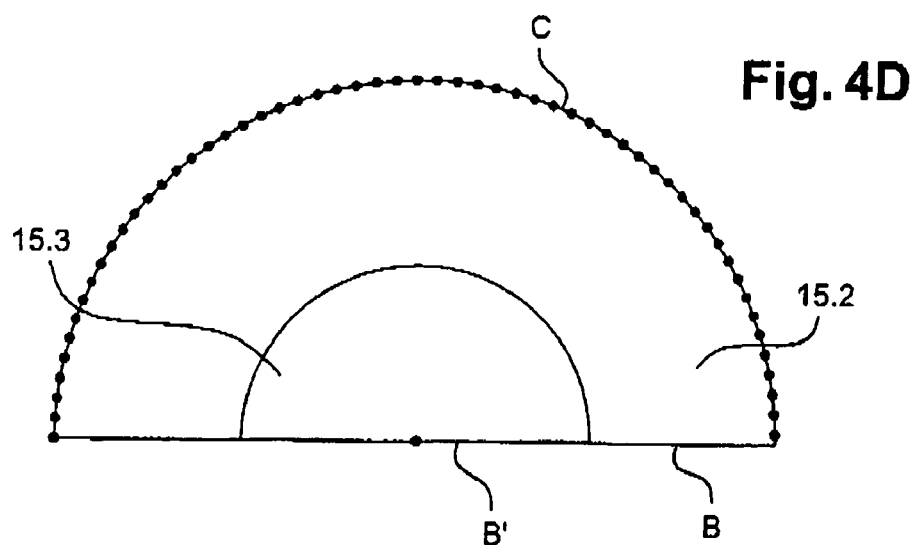

FIG. 4D shows a front view of an example of bimorph actuation means 15 similar to those in FIGS. 4A and 4B. Embedding of the rounded edge C of the membrane 15.2 is shown by thick dashed lines.

In FIG. 4, the means of applying the excitation signal have been omitted so as to not make the figures too complicated. These means depend on the type of excitation signal to be applied and therefore the type of active material. It has been seen that this material may be piezoelectric, magnetostrictive, and that it may be a shape memory alloy or a thermal effect material with a coefficient of thermal expansion sufficiently different from the coefficient of thermal expansion of the passive flexible structure 15.2.

It has been shown that a maximum amplitude deformation at the middle of edge B may be obtained for a given excitation signal, if the length of the straight edge B' of the part 15.3 made of an active material is equal to approximately ⅔ of the length of the edge B of the passive flexible structure 15.2. This is the location at which the torsion arm 14 is fixed.

Figure 5A:
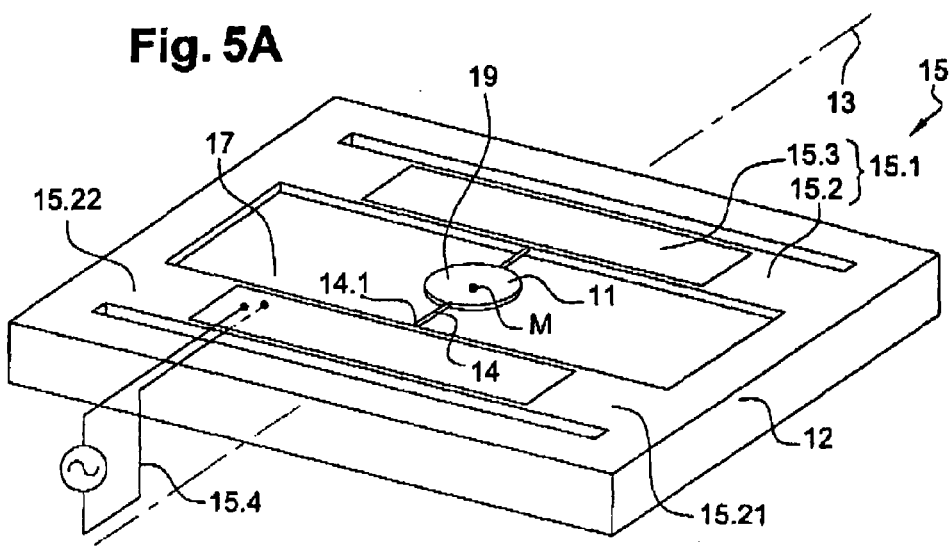
FIGS. 5A, 5B, 5C show a global view of another example of a micromirror according to the invention, deformations of one of its beams, and a top view of its bimorph actuation means, respectively.

FIG. 5A illustrates another example of a micromirror according to the invention.

The bimorph activation means 15 still comprise a solid stack 15.1 for each torsion arm 14, with deposited or add-on layers, including a part 15.3 made of an active material cooperating with a passive flexible structure 15.2. In this example, the passive flexible structure 15.2 is in the form of a beam in which the two ends 15.21, 15.22 are fixed to the fixed part 12. The fixed part 12 is in the form of a frame, the ends 15.21, 15.22 of the two beams 15 are embedded on the opposite edges of the frame. The excitation means 15.4 of the part 15.3 made of an active material have been outlined, and it may be a pair of electrical contacts (or electrodes) sandwiching the part 15.3 made of an active material (particularly if it is of the piezoelectric type), these contacts being connected to an alternative energy source.

The frame has been shown as being rectangular, but other shapes are possible, for example circular, ovoid, square or other.

The mobile part 11 equipped with two torsion arms 14 is mounted between the two beams 15.2 that are approximately parallel. As before, the end 14.1 of a torsion arm 14 is fixed to a beam 15.2 preferably at a point subjected to a large vertical deformation when the part 15.3 made of the excited active material applies a force to the beam.

When the stack 15.1 of bimorph actuation means 15 is subjected to an alternating electrical field in the vertical direction produced by the excitation means 15.4, it starts to vibrate vertically. In this movement, it entrains the fixed part in the form of a frame 12 to which it is fixed and the torsion arms 14. The stack 15.1 (beam shape) is fixed by its ends to the frame 12 and the frame is rigid, so that it does not deform but it is simply entrained as a single piece in a vertical vibration movement.

Figure 2A:
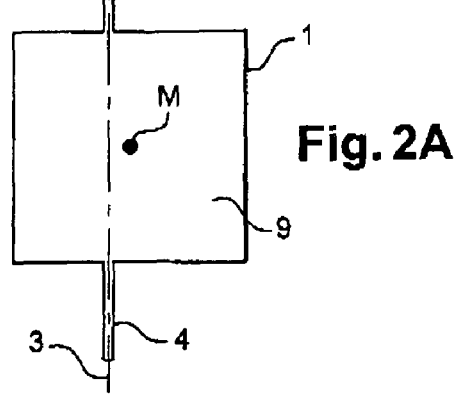
FIGS. 2A to 2D (already described) show a front and sectional view of various positions occupied by the mobile part of the micromirror during its actuation.
Figure 2C:
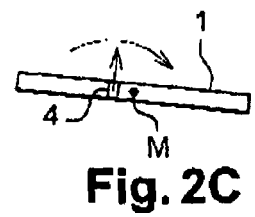
Figure 2B:
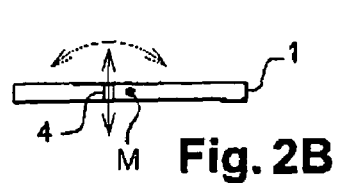
Figure 2D:
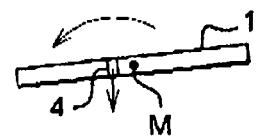
Figure 3:
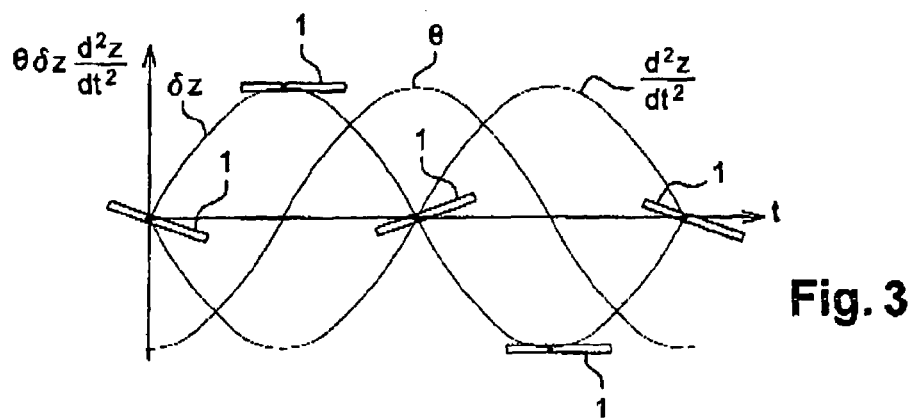
FIG. 3 (already described) is a graph showing variations as a function of time of the angle of inclination θ of the mobile part of the micromirror in FIG. 1, the vertical displacement of the bimorph element made of piezoelectric ceramic, and its acceleration.

Since the torsion arms 14 are offset from the centre of the mass M of the mobile part 11, the asymmetry of the mass distribution around the axis 13 will generate a torque entraining the mobile part 11 in an oscillation movement around the axis 13. The micromirror is then in an activated state. It will move into median and extreme positions like those shown in FIGS. 2B to 2D.

The oscillation movement of the mobile part 11 is synchronous with excitation of the bimorph actuation means 15. When the frequency of the excitation is equal to the mechanical resonant frequency of the mobile part 11, the oscillation amplitude of the mobile part 11 is maximum.

Figure 5B:
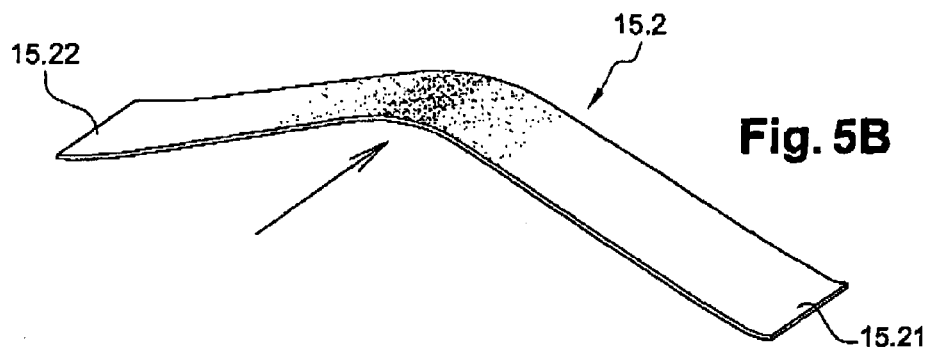

In this example, the central part of the beam 15.2 is affected by the strong vertical deformation as indicated by the tip of the arrow in FIG. 5B. In this Figure, the beam 15.2 is bent. The ends 15.21, 15.22 are not at all deformed or are only slightly deformed. In the same way as above, the grey shade provides information about the amplitude of the deformation. This deformation amplitude controls the oscillation amplitude.

The mobile part 11 is suspended approximately in the central part of the frame of the fixed part 12, this part corresponds to a recess and the mobile part 11 can therefore start oscillating about the axis 13 without colliding with the fixed part 12.

Figure 5C:
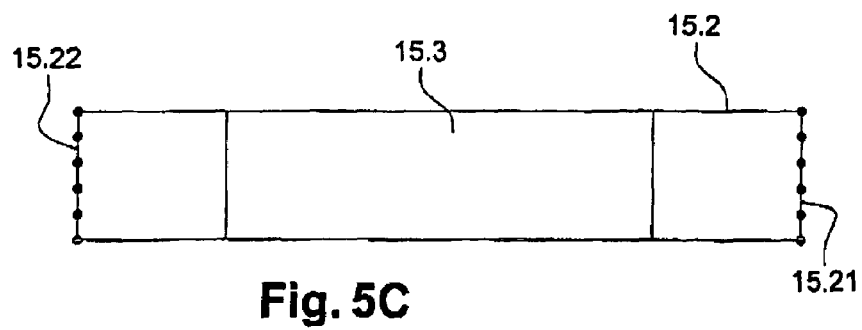

The part 15.3 made of an active material is a layer that forms the stack 15.1 with the beam 15.2. It covers the beam 15.2 either entirely or partially. In the example in FIG. 5A, the layer 15.3 of active material only covers a median part of the beam and the two end parts of the beam 15.2 are exposed. These two end parts are approximately equal. In the same way as in FIG. 4D, in FIG. 5C the layer 15.3 of active material is placed on an area of the beam 15.2 subjected to a strong deformation. Embedding of the two ends 15.21, 15.22 of the beam is materialised by thick dotted lines.

In the same way as above, it has been shown that the amplitude of the deformation of the beam is maximum at the middle, for a given excitation signal, if the part 15.3 made of an active material leaves the beam exposed at each of its ends over about ⅙ of its length.

The geometric shapes and relative positions of passive flexible structures, parts made of an active material, fixed and mobile parts described above are not limitative.

In these examples, the passive flexible structure may be made of a semiconducting material, for example a monocrystalline silicon, polycrystalline silicon or other material like the mobile part, the torsion arms and the fixed part. In micro-systems, the most frequently used material is monocrystalline silicon, due to its qualities. However, it is quite possible that the passive flexible structure, the torsion arms, the mobile part and the fixed part could be made of different materials, provided that they can be structured at the micrometric scale. Metallic materials based on gold, aluminium, tungsten and other semiconducting materials such as gallium arsenide, silicon derivatives such as silicon nitride or oxide or polymers, etc., could be used. We will now give some typical dimensions for the different parts of the micromirror.

The width and thickness of the mobile part 11 are determined by the optical function of the reflecting area 19. Since the reflecting area occupies an entire main face of the mobile part, the size of the mobile part (which is usually a diameter) may be between a few hundred micrometers and a few millimetres. Its thickness may be of the order of a few tens of micrometers.

The passive flexible structure 15.2 must be sufficiently thin to be flexible, which was not the case for the frame in prior art. Its thickness may be between a few micrometers and a few tens of micrometers. Its lateral dimensions (edge B or length of the beam) are typically between about a few hundred micrometers and a few millimetres. A compromise must be found between the thickness and the lateral dimensions to obtain the required flexibility.

The thickness of the part made of an active material is determined by the deposition technology and by the nature of the material. It must also be thin, typically between a few tenths of a micrometer and a few micrometers.

The torsion arms are sized such that their stiffness can be adjusted so that the resonant frequency can be tuned, and therefore the oscillation frequency of the mobile part can also be tuned to a required value.

We will now consider an example manufacturing process for a micromirror according to the invention with bimorph actuation means. The described example is applicable to a piezoelectric type active material or to a thermal effect active material such as zinc oxide, but the process could be applicable to other types of materials. Refer to FIGS. 6A to 6J.

Figure 6A:
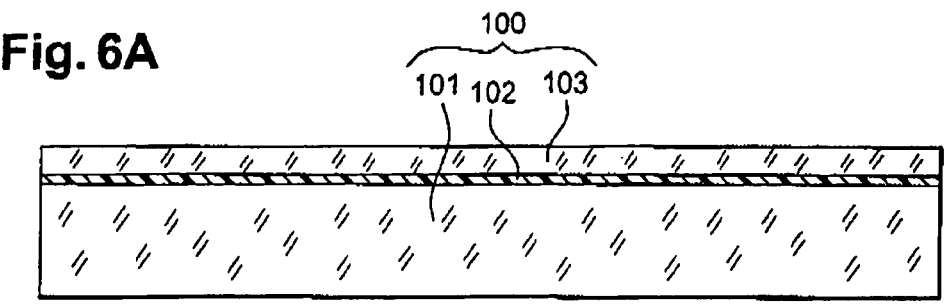
FIGS. 6A to 6J show different steps in an example process for making a micromirror with bimorph actuation according to the invention, particularly of the piezoelectric type.
Figure 6B:
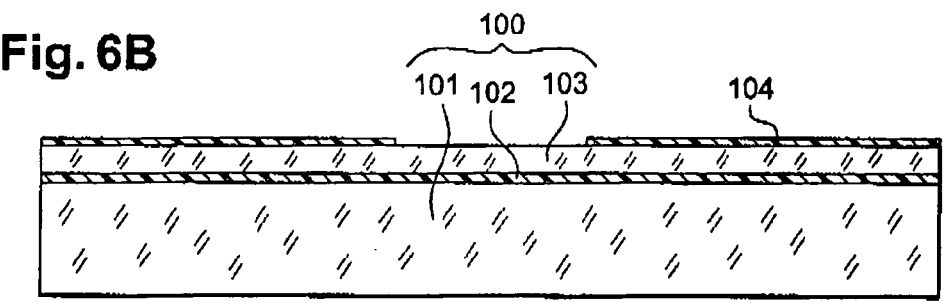

The starting point is a substrate 100 formed from a layer 102 made of an insulating material buried between two layers 101, 103 of a semiconducting material, the layer 101 of the semiconducting material is said to be the base layer and the layer 103 of the semiconducting material is said to be the surface layer (FIG. 6A).

This substrate 100 may be an SOI (silicon on insulator) substrate, with a layer 102 of silicon oxide buried in a silicon substrate. This type of SOI substrate facilitates manufacturing of the mobile part that is suspended from the fixed part.

The first step will be to make the bimorph actuation means and particularly the part made of active material and possibly excitation means if they are fixed to the substrate. The passive flexible structure will be formed in the surface semiconducting layer.

In the example in FIG. 6, the part made of active material, which may be a piezoelectric or thermal effect material, in each of the stacks will be sandwiched between a pair of electrodes that will contribute to creating the excitation. In the case of the piezoelectric material, the electrodes will contribute to setting up the electrical excitation field. In the case of the thermal material, they will enable an electric current to pass in the part made of an active material so as to cause heating of this part by the Joule effect. These electrodes shall be electrically isolated from the semiconducting material. In one pair of electrodes, a lower (first) electrode is defined that is made first, and an upper (second) electrode is made afterwards. Consequently, an insulating base 104 is made under each of the lower electrodes to obtain this isolation.

To achieve this, an insulating layer is made on the surface semiconducting layer 103. This insulating layer will form the insulating base 104 under each lower electrode once modelled around the contour of the lower electrode that is formed later. The insulating layer 104 may for example be made by chemical vapour phase deposition of silicon oxide or nitride or other. The contour of the insulating base 104 may for example be made by ionic reactive etching or wet etching with hydrofluoric acid or other. As a variant, the insulating base 104 may be made by thermal oxidation of the semiconducting material in the surface semiconducting layer 103 followed by etching, for example of the same type as the etching techniques mentioned above (FIG. 6B).

Figure 6C:
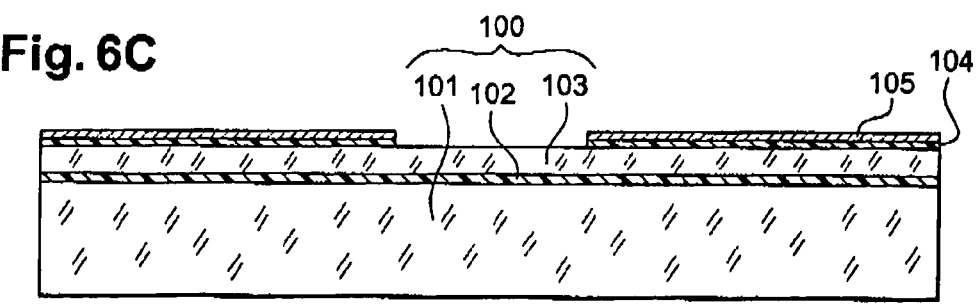

The next step is to make a lower electrode 105 on each insulating base 104. For example, this may be a deposition step by evaporation, sputtering or electrolytic deposition of a metallic material. This metallic material may for example be based on aluminium in the case of a thermal effect active material, or based on gold or platinum in the case of a piezoelectric active material. This deposition step is followed by an etching step to delimit the contour of each lower electrode 105 (FIG. 6C). The thickness of the lower electrodes 105 is typically of the order of a few tenths of a micrometer. Another function of this metallic deposition is to facilitate bonding of the active material that will be deposited later.

Figure 6D:
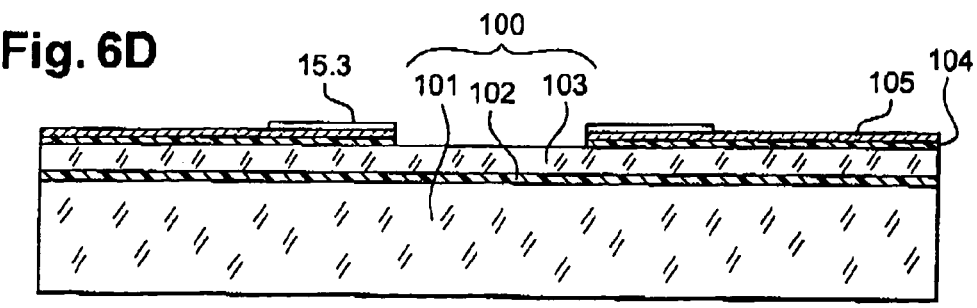

The next step is a step to manufacture the part made of an active material for each stack. In the example described, it is a piezoelectric material or a thermal effect material 15.3. For example, the active material is deposited by a cathode sputtering process or an organo-metallic vapour phase deposition process and for example it is etched using a solution based on hydrofluoric acid and hydrochloric acid to delimit the contour of each part 15.3 made of an active material (FIG. 6D). The active material does not fully cover each lower electrode 105, since it is then necessary to access the electrodes to apply excitation signals to them. For example, the piezoelectric material may be PZT and the thermal effect material may be zinc oxide. Its thickness is typically of the order of one micrometer.

Figure 6E:
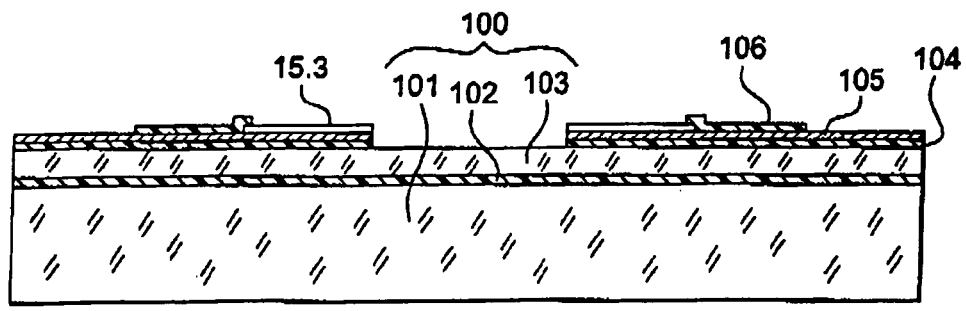

In a pair of electrodes, the upper electrode must be electrically insulated from the lower electrode. A second insulating base 106 will be made at the locations at which the upper electrode (made later) could be above the lower electrode 105 (FIG. 6E). The second insulating base 106 is preferably made from the same material as the first insulating base 104.

The first and second insulating bases 104, 106 must be sufficiently thick to electrically isolate the lower electrode from the upper electrode of a pair. Their thickness with silicon oxide is greater than about 0.2 micrometers, if the excitation voltage to be applied between the electrodes of a pair is less than 100 Volts.

Figure 6F:
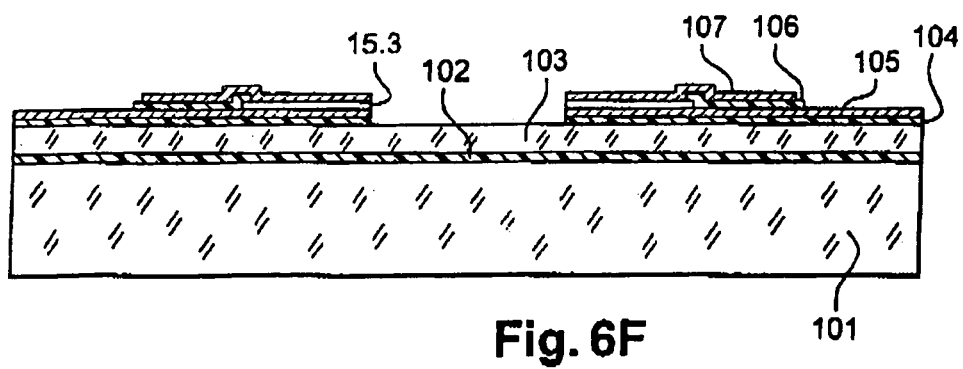

An upper electrode 107 is made on each second insulating base 106. The same procedure can be used as for the lower electrode 105 (FIG. 6F). Its thickness is approximately the same as the thickness of the lower electrode. Its composition in the case of the piezoelectric active material is approximately the same as the composition of the lower electrode. In the case of the thermal effect active material, it may be made based on gold.

Figure 6G:
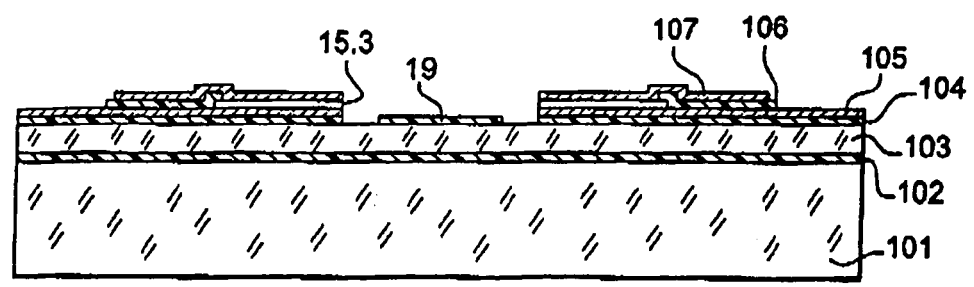

The reflecting area 19 of the mobile part can be made. For example, it may be made by a deposition by evaporation, sputtering or an electrolytic deposition of a reflecting material, for example based on gold, aluminium or other. An etching operation, for example by ionic reactive etching, wet etching with phosphoric acid or other, can be used to delimit its contour (FIG. 6G). The deposition of the reflecting material is optional, the area of the surface semiconducting layer 103 may be used as the reflecting area if possible depending on its surface condition.

Figure 6H:
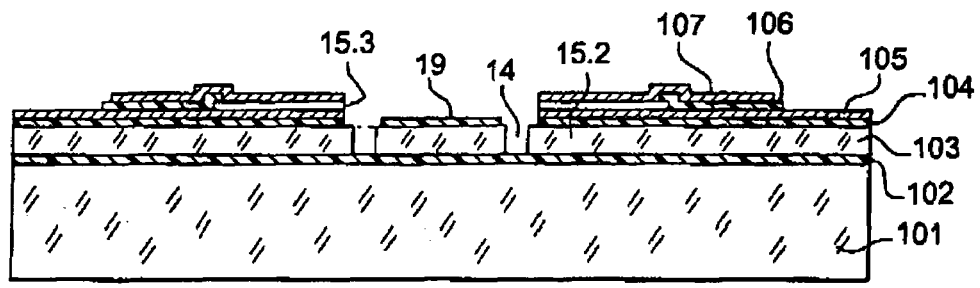

The next step is to use etching, for example RIE (Reactive Ion Etching) to delimit the contour of the mobile part 11, the torsion arms 13 and each passive flexible structure 15.2. These elements are located in the surface semiconducting layer 103 and therefore the etching attacks this semiconducting layer 103 and the buried insulating layer 102 acts as a stop (FIG. 6H).

Figure 6I:
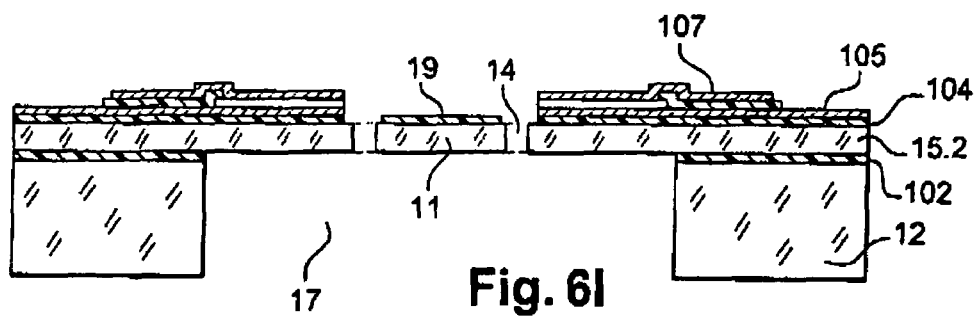

The next step is to make the space 17 around the mobile part 11, torsion arms 14 and under a part of the passive flexible structures 15.2. This is equivalent to releasing the mobile part 11, the torsion arms 14 and the passive flexible structures 15.2. The base semiconducting layer 101 and the buried insulating layer 102 are etched anisotropically, by a wet or dry method. Etching is done starting from the face of the base semiconducting layer 101 not covered by the buried insulating layer 102. The remaining part of the base semiconducting layer 101 and the buried insulating layer 102 acts as the fixed part 12 (FIG. 6I). During this operation, it is planned to protect the face of the micromirror on the side of the bimorph actuation means and the reflecting area 19 with a resin, which is then removed.

Figure 6J:
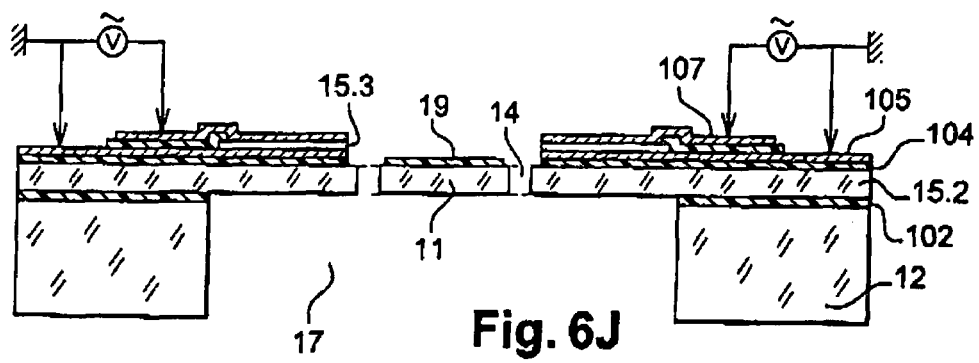

The last step is to test the operation of the micromirror by applying a sinusoidal voltage V between the lower electrode 105 and the upper electrode 107 of at least one pair, and monitoring the movement of the mobile part 11 (FIG. 6J).

One advantage of such a micromirror is that it may be entirely manufactured collectively with others on a same substrate, which was not the case before. This is why its cost is lower than the cost of conventional micromirrors. Another advantage is that the passive structure is genuinely flexible, thin and fragile, the deposition or the transfer of the part made of the active material and partial removal of the base semiconducting layer will not deteriorate it.

This type of bimorph actuation means can be used to oscillate the mobile part of the micromirror with a large amplitude while maintaining a high quality reflecting part.

The terms <<top>>, <<bottom>>, <<lower>>, <<upper>>, <<horizontal>>, <<vertical>> and other terms are applicable to the embodiments shown and described with relation to the Figures. They are used only for the purposes of the description and do not necessarily relate to the position occupied by the micromirror when it is in operation.

Although several embodiments of micromirrors have been described, this invention is not limited strictly to these embodiments.

The present invention relates to a micromirror comprising a mobile part with a reflecting area, a fixed part, two torsion arms originating from the mobile part materializing an axis about which the mobile part can oscillate, this axis being approximately parallel to a principal plane of the mobile part and passing through the mobile part while being offset from the centre of mass mobile part each torsion arm having one end connected to the fixed part bimorph actuation means The bimorph actuation means comprise a solid stack with deposited or add-on layers for each torsion arm including a part made of an active material capable of changing volume and/or shape under the effect of an excitation, co-operating with a passive flexible structure.

The invention claimed is:

1. Micromirror comprising a mobile part with a reflecting area, a fixed part, two torsion arms originating from the mobile part materializing a single axis about which the mobile part can oscillate, the single axis being approximately parallel to a principal plane of the mobile part and passing through the mobile part and offset from a centre of mass of the mobile part, each torsion arm having one end connected to the fixed part through bimorph actuation means, characterised in that the bimorph actuation means comprises a solid stack with deposited or add-on layers for each torsion arm, including a part made of an active material capable of at least one of changing volume and shape under the effect of an excitation, co-operating with a passive flexible structure.

2. Micromirror according to claim 1, in which the active material is a piezoelectric material, a magnetostrictive material, a thermal effect material with a coefficient of thermal expansion sufficiently different from the coefficient of thermal expansion of the material from which the passive flexible structure is made, or a shape memory alloy.

3. Micromirror according to claim 1, in which the bimorph actuation means include means of excitation of the part made of the active material.

4. Micromirror according to claim 1, in which at least one of the torsion arms is connected to the passive flexible structure.

5. Micromirror according to claim 4, in which the connection between the torsion arm and the passive flexible structure is made in an area with a strong deformation under the effect of the at least one of volume and shape change of the part made of the active material, induced by excitation.

6. Micromirror according to claim 1, in which the part made of an active material and the passive flexible structure have a total or partial overlap.

7. Micromirror according to claim 6, in which the overlap is made in an area with a strong deformation of the passive flexible structure when it is partial.

8. Micromirror according to claim 1, in which the passive flexible structure is in the form of a membrane fixed to the fixed part through at least one edge portion and with at least one other free edge portion on which a torsion arm is fixed.

9. Micromirror according to claim 1 in which the membrane is approximately a half-disk with a rounded edge and a straight edge, the straight edge being free and the rounded edge being fixed to the fixed part.

10. Micromirror according to claim 9, in which the part made of the active material is approximately in the form of a half-disk with a straight edge approximately in line with and centred on the straight edge of the membrane.

11. Micromirror according to claim 10, in which the length of the straight edge of the half-disk of the part made of the active material is equal to about ⅔ of the length of the straight edge of the membrane.

12. Micromirror according to claim 1, in which the passive flexible structure is in the form of a beam, the ends of which are fixed to the fixed part, a torsion arm being fixed approximately in a central area of the beam.

13. Micromirror according to claim 12, in which the part made of the active material occupies the central area of the beam leaving each end exposed over about ⅙ of the length of the beam.

14. Micromirror according to claim 1, wherein the reflecting area is a reflecting material disposed on a surface of a semiconductor layer of the mobile part.

15. Micromirror according to claim 1 wherein the excitation means further comprises a first electrode and a second electrode, the first electrode coupled to a bottom surface of the part made of the active material and the second electrode coupled to a top surface of the part made of the active material.

16. Micromirror according to claim 1 further comprising a first insulating base positioned between the bottom surface of the part of made of the active material and a semiconducting layer.

17. Micromirror according to claim 16 further comprising a second insulating base between the first electrode and the second electrode, wherein the second insulating base isolates the first and second electrodes from each other.

18. Light deflecting apparatus comprising:
a base having a first end and a second end;
a flexible material in contact with the base at the first end and the second end, the flexible material having a gap located between the first and second ends;
a light deflecting element located at the gap and having only two arms extending from the light deflecting element toward the flexible material, the arms positioned along a single axis of rotation passing through the first and second ends and offset from a center of mass of the light deflecting element; and
a bimorph actuator between at least one of the arms and the first end, the bimorph actuator configured to move the flexible material in a first and second direction with respect to the base to rotate the light deflecting element about the single axis.

19. Light deflecting apparatus comprising:
a base having a first end, a second end, and a gap therebetween;
a first flexible portion in contact with the base at the first end;
a second flexible portion in contact with the base at the second end;
a light deflecting element positioned at the gap and having only two arms extending therefrom, the two arms coupled to the first and second flexible portions, the light deflecting element configured to rotate about a single axis formed by the two arms and passing through the first and second ends, wherein the axis is offset from a center axis of the light deflecting element; and means for actuating at least one of the first and second flexible portions in a direction substantially perpendicular to the first and second ends, wherein light deflecting element rotates about the single axis during movement of the at least one of the first and second flexible portions.

* * * * *